United States Patent
Moerbe

(10) Patent No.: US 9,573,590 B2
(45) Date of Patent: Feb. 21, 2017

(54) METHOD FOR STABILIZING A TWO-WHEELED VEHICLE DURING CORNERING

(71) Applicant: Robert Bosch GmbH, Stuttgart (DE)

(72) Inventor: Matthias Moerbe, Ilsfeld-Helfenberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 94 days.

(21) Appl. No.: 14/413,183

(22) PCT Filed: Apr. 24, 2013

(86) PCT No.: PCT/EP2013/058445
§ 371 (c)(1),
(2) Date: Jan. 6, 2015

(87) PCT Pub. No.: WO2014/009033
PCT Pub. Date: Jan. 16, 2014

(65) Prior Publication Data
US 2015/0203110 A1    Jul. 23, 2015

(30) Foreign Application Priority Data
Jul. 10, 2012  (DE) .................. 10 2012 211 963

(51) Int. Cl.
| | |
|---|---|
| B60W 30/045 | (2012.01) |
| B60W 10/06 | (2006.01) |
| B60W 10/18 | (2012.01) |
| B60W 30/04 | (2006.01) |
| B62J 27/00 | (2006.01) |
| B62K 21/00 | (2006.01) |
| B60T 7/12 | (2006.01) |
| B60T 8/17 | (2006.01) |

(Continued)

(52) U.S. Cl.
CPC .............. *B60W 30/045* (2013.01); *B60T 7/12* (2013.01); *B60T 8/17* (2013.01); *B60T 8/171* (2013.01);
(Continued)

(58) Field of Classification Search
CPC ............ B60W 30/045; B60W 2300/36; B60W 2030/043; B60W 10/06; B60W 30/18; B60W 10/18; B60W 30/04; B60W 30/18145; B60T 7/12; B60T 8/1706; B60T 8/17554; B60T 8/17; B60T 8/171; B60T 8/172; B60T 8/246; B60T 8/26; B60T 8/3225; B60T 2230/03; B62J 27/00; B62K 21/00; B62K 2207/00
See application file for complete search history.

(56) References Cited

U.S. PATENT DOCUMENTS 5,408,411 A * 4/1995 Nakamura ......... B60G 17/0182
                                                701/48
5,445,443 A * 8/1995 Hauser .................. B60T 8/1706
                                                303/137
(Continued)

FOREIGN PATENT DOCUMENTS

| DE | 102 35 378 | 2/2004 |
|---|---|---|
| DE | 10 2007 061114 | 6/2009 |

(Continued)

OTHER PUBLICATIONS

International Search Report for PCT/EP2013/058445, dated Jul. 23, 2013.

*Primary Examiner* — Russell Frejd
(74) *Attorney, Agent, or Firm* — Gerard Messina

(57) ABSTRACT

In a method for stabilizing a two-wheeled vehicle during cornering, a drifting of the rear wheel or an understeering of the front wheel is inferred on the basis of measured values including the actual steering angle, and the two-wheeled vehicle is stabilized by altering the torque at the front wheel and/or the rear wheel.

11 Claims, 2 Drawing Sheets

(51) Int. Cl.
  *B60T 8/1755* (2006.01)
  *B60T 8/171* (2006.01)
  *B60T 8/172* (2006.01)
  *B60T 8/24* (2006.01)
  *B60T 8/26* (2006.01)
  *B60T 8/32* (2006.01)
  *B60W 30/18* (2012.01)
  *B60W 10/04* (2006.01)

(52) U.S. Cl.
  CPC .............. *B60T 8/172* (2013.01); *B60T 8/1706* (2013.01); *B60T 8/1755* (2013.01); *B60T 8/246* (2013.01); *B60T 8/26* (2013.01); *B60T 8/3225* (2013.01); *B60W 10/04* (2013.01); *B60W 10/06* (2013.01); *B60W 10/18* (2013.01); *B60W 30/04* (2013.01); *B60W 30/18* (2013.01); *B60W 30/18145* (2013.01); *B62J 27/00* (2013.01); *B62K 21/00* (2013.01); *B60T 2230/03* (2013.01); *B60W 2030/043* (2013.01); *B60W 2300/36* (2013.01); *B62K 2207/00* (2013.01)

(56) References Cited

U.S. PATENT DOCUMENTS

| | | | |
|---|---|---|---|
| 7,581,611 B1 * | 9/2009 | Kratz | A63H 17/21 180/222 |
| 9,266,532 B2 | 2/2016 | Meissner et al. | |
| 2008/0007022 A1 * | 1/2008 | Jones | B60G 3/10 280/124.13 |
| 2009/0222164 A1 * | 9/2009 | Seiniger | B60T 8/1706 701/36 |
| 2010/0211256 A1 * | 8/2010 | Takenaka | B60T 8/172 701/31.4 |
| 2012/0080249 A1 * | 4/2012 | Yates, III | B60L 7/18 180/65.31 |
| 2013/0090828 A1 * | 4/2013 | Lemejda | B60W 10/06 701/83 |
| 2014/0129088 A1 * | 5/2014 | Meissner | B60W 10/04 701/41 |

FOREIGN PATENT DOCUMENTS

| | | |
|---|---|---|
| DE | 10 2008 001970 | 12/2009 |
| DE | 10 2010 003951 | 10/2011 |
| EP | 1 488 974 | 12/2004 |
| EP | 2 460 703 | 6/2012 |
| GB | 2 454 339 | 5/2009 |
| JP | 05-041698 A | 2/1993 |
| JP | 2004-051091 A | 2/2004 |
| JP | 2009-078663 A | 4/2009 |
| JP | 2009-132271 A | 6/2009 |
| JP | 2011-025815 A | 2/2011 |
| JP | 2011-094619 A | 5/2011 |
| JP | 2011-520703 A | 7/2011 |
| JP | 2011-207314 A | 10/2011 |
| WO | WO 2006/077211 | 7/2006 |
| WO | 2012/034738 A1 | 3/2012 |

* cited by examiner

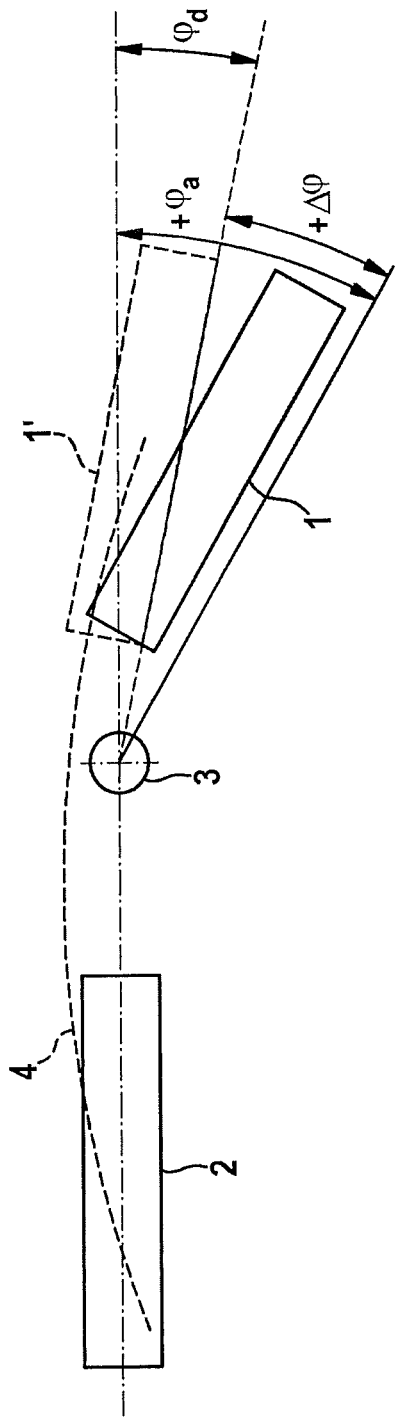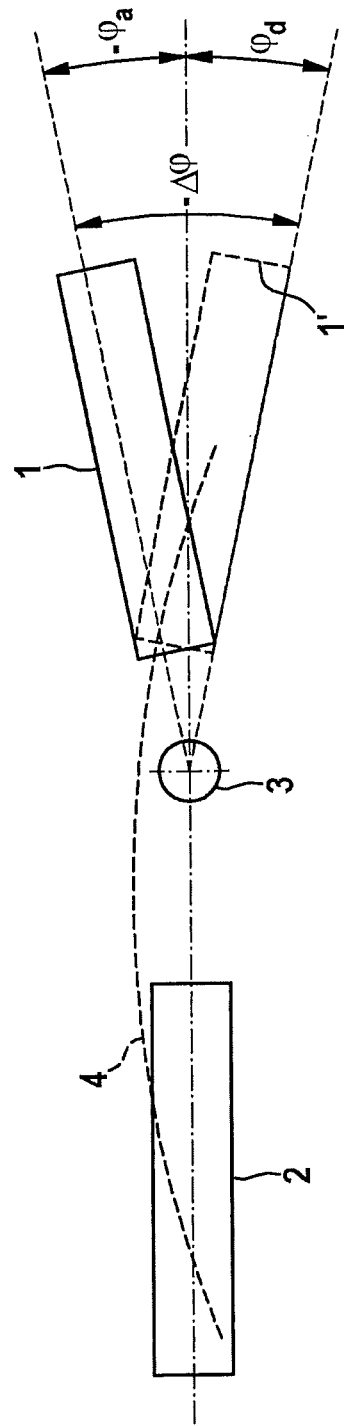

METHOD FOR STABILIZING A TWO-WHEELED VEHICLE DURING CORNERING

BACKGROUND OF THE INVENTION

1. Field of the Invention

The present invention relates to a method for stabilizing a two-wheeled vehicle during cornering.

2. Description of the Related Art

For a motorcycle to be able to travel stably through a curve, the velocity of the two-wheeled vehicle, the angle of inclination, and the steering angle must be adapted to the actual curve radius. A velocity that has not been adapted or an incorrect steering angle can lead to a critical driving situation where the two-wheeled vehicle oversteers or understeers, thus the rear wheel begins to drift, respectively the front wheel overshoots the curve. Inherent to such situations is a high hazard potential.

BRIEF SUMMARY OF THE INVENTION

It is an object of the present invention to automatically stabilize a two-wheeled vehicle during cornering.

The method according to the present invention makes it possible to stabilize a two-wheeled vehicle, in particular a motorcycle or some other engine-powered, two-wheeled vehicle that is cornering and is approaching a critical driving state. Such critical driving states occur during cornering if the current vehicle velocity, the steering angle and/or the angle of inclination of the two-wheeled vehicle are not suitable for the curve radius. Particularly in the case of a deviation of the actual steering angle from a nominal steering angle, an understeering or oversteering of the two-wheeled vehicle can occur. In the case of an oversteering, the rear wheel of the two-wheeled vehicle drifts and begins to move outwardly with a radial component from the ideal line, whereas, in the case of an understeering, the front wheel drifts outwardly with a radial component.

In the method according to the present invention, a sensor system in the two-wheeled vehicle may be used to detect an imminent or already occurred critical driving state, current vehicle state quantities being measured by the sensor system. Via the sensor system, the current steering angle is also determined that is drawn upon to differentiate between drifts of the rear wheel and understeering of the front wheel. Thus, taking into account the current steering angle, it is possible to infer the type of imminent or already occurred vehicle instability, whereupon appropriate vehicle stabilization measures may be taken. These measures involve altering the torque being applied to the front wheel and/or the rear wheel, it being possible to adjust, respectively modify the engine torque and/or the braking torque at the rear wheel and the braking torque at the front wheel. The adjustment is carried out automatically via actuating signals from a regulating or control unit in the vehicle via which an actuator in the engine, respectively in the wheel brakes is adjusted to achieve the desired torque.

In addition to the current steering angle, acceleration values of the two-wheeled vehicle are advantageously ascertained via the sensor system, at least translational accelerations in all three spatial directions; if indicated, in addition, rotational accelerations about all three spatial axes being determined. A sensor system of this kind may, in some instances, be part of a traction-slip control or of some other driver assistance system already present in the vehicle, so that the sensor system may also be additionally used for the method according to the present invention. The steering angle is likewise detected via a sensor system provided in the vehicle.

From the measured state variables, in particular the acceleration values, the imminent critical driving state may be advantageously ascertained with a lead time of a few seconds, for example; thereby allowing stabilizing measures, respectively measures preventing the critical state, to be taken already before the critical state occurs by generating actuating signals.

In accordance with another aspect of the present invention, a nominal steering angle is determined at which the two-wheeled vehicle drives through the curve under optimal conditions, thus in the stable driving state. By comparing the actual steering angle and the nominal steering angle, the critical driving state may be inferred, either at the front wheel or the rear wheel. Depending on the deviation of the actual steering angle from the nominal steering angle in the positive or negative direction, the critical driving state relates to either the rear wheel or the front wheel, whereupon an adapted, stabilizing measure is taken to influence the torque at the front wheel and/or at the rear wheel. Typically, the stabilizing measures differ depending on whether the rear wheel drifts or the front wheel understeers.

The nominal steering angle is ascertained, for example, from the current angle of inclination of the two-wheeled vehicle and the current vehicle velocity. The vehicle velocity is known from sensor data.

The angle of inclination may be calculated from measured acceleration values, for example.

Upon drifting of the rear wheel, respectively of the entire two-wheeled vehicle, the longitudinal axis of the two-wheeled vehicle deviates from the current tangent to the path curve. The drifting may be restored to an acceptable level by applying the stabilizing measures, thus influencing the torque at the rear wheel and/or at the front wheel. It may be expedient to allow a maximum tolerance for drift angle in the form of a permitted angular difference in the positive and negative directions, it being necessary for the tolerance for drift angle to be set at the factory, if indicated, however, also by the driver. The handling performance of the two-wheeled vehicle is influenced as a function of the drift angle tolerance; a greater drift angle tolerance corresponding to a sportier handling performance.

To stabilize the vehicle, the vehicle velocity is effectively reduced by influencing the torque at the front wheel and/or the rear wheel. In principle, however, it is also possible to increase the velocity by cancelling a currently applied braking torque, respectively by increasing the engine torque.

The method is carried out in the regulating, respectively control unit where the measurement signals of the sensor system are analyzed, and where it is established in accordance with a stored logic whether a critical driving situation is present or is imminent during cornering. If this is the case, actuating signals are produced in order to modify the torques currently being applied at the front wheel and/or the rear wheel in the manner described above. In this connection, the regulating, respectively control unit is advantageously a component of a driver assistance system for driving dynamics control.

BRIEF DESCRIPTION OF THE DRAWINGS

FIG. 1 shows in a schematic representation, a motorcycle in a cornering maneuver where the front wheel is understeering.

FIG. 2 shows a representation corresponding to FIG. 1, however, with a drifting rear wheel.

DETAILED DESCRIPTION OF THE INVENTION

Figure 3:
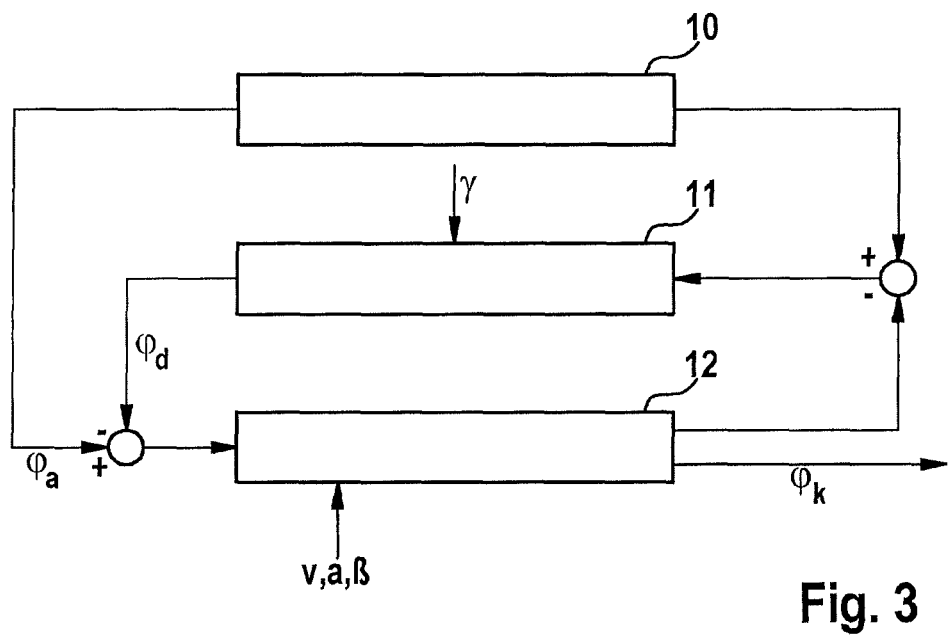
FIG. 3 shows a block diagram for stabilizing the two-wheeled vehicle during cornering.

Identical or corresponding components are provided with the same reference numerals in the figures.

In a highly schematized view, FIGS. 1 and 2 show a two-wheeled vehicle during cornering that has a front wheel 1 and a rear wheel 2; front wheel 1 being adjusted about a steering axis 3 by actual steering angle $\Delta\phi_a$. In FIG. 1, the vehicle understeers; accordingly actual steering angle $\Delta\phi_a$ is positive. In FIG. 2, the vehicle oversteers; actual steering angle $\phi_a$ is negative. In both FIGS. 1 and 2, the nominal steering angle, which represents the ideal position of the front wheel on path curve 4, is denoted by $\phi_d$. The ideal nominal position of the front wheel is drawn as a dotted line and is characterized by reference numeral $1^1$. Steering angle difference $\Delta\phi$ is derived from the difference between actual steering angle $\phi_a$ and nominal steering angle $\phi_d$. In the case of the understeering in accordance with FIG. 1, steering angle difference $\Delta\phi$ is positive; in the case of the oversteering in accordance with FIG. 2, it is negative.

Since the two-wheeled vehicle moves on a path curve 4, it also has an angle of inclination. Ideally, a defined value for the angle of inclination, as well as for the steering angle is associated with a given curve radius and a specific vehicle velocity. In response to a deviation of actual steering angle $\phi_a$ from nominal steering angle $\phi_d$, the two-wheeled vehicle begins to understeer, respectively oversteer, so that a steering angle difference $\Delta\phi$ unequal to zero ensues. To compensate for the understeering, respectively oversteering, the torque currently being applied may be automatically influenced at front wheel 1 and/or rear wheel 2. In the front wheel section, the currently applied braking torque may be modified; in the rear wheel section, the driving torque may be modified by intervening in the engine management; or the braking torque may be modified by intervening in the rear wheel brake. The torques are modified via actuating signals of a regulating, respectively control unit that is incorporated in the two-wheeled vehicle and that generates actuating signals from input signals via which actuators in the engine, respectively in the wheel brakes are adjusted at the front or rear wheel.

FIG. 3 shows a block diagram including the basic functional sequence of the feedback control for stabilizing the two-wheeled vehicle during cornering. A first block 10 represents the sensor system in the motor vehicle that, for example, may be part of a traction-slip control installed in the two-wheeled vehicle and via which the translational and rotational accelerations in all three spatial directions may be ascertained as vehicle state quantities. Moreover, the vehicle velocity, as well as the wheel speeds are to be detected at the front wheel and rear wheel. Moreover, the vehicle is equipped with a sensor system for determining actual steering angle $\phi_a$.

Another block 11 represents an observer which, on the output side, delivers a nominal steering angle $\phi_d$ that is subtracted from actual steering angle $\phi_a$ in order to ascertain steering angle difference $\Delta\phi$. Steering angle difference $\Delta\phi$ is fed as an input quantity to a block 12 that represents a vehicle model to which the measurement signals may be additionally fed as input quantities, for example, vehicle velocity $\upsilon$, accelerations a, in particular, the longitudinal acceleration and the transversal acceleration of the vehicle, as well as angle of inclination $\beta$, that is advantageously not measured, rather may be ascertained from measured quantities.

Figure 4:
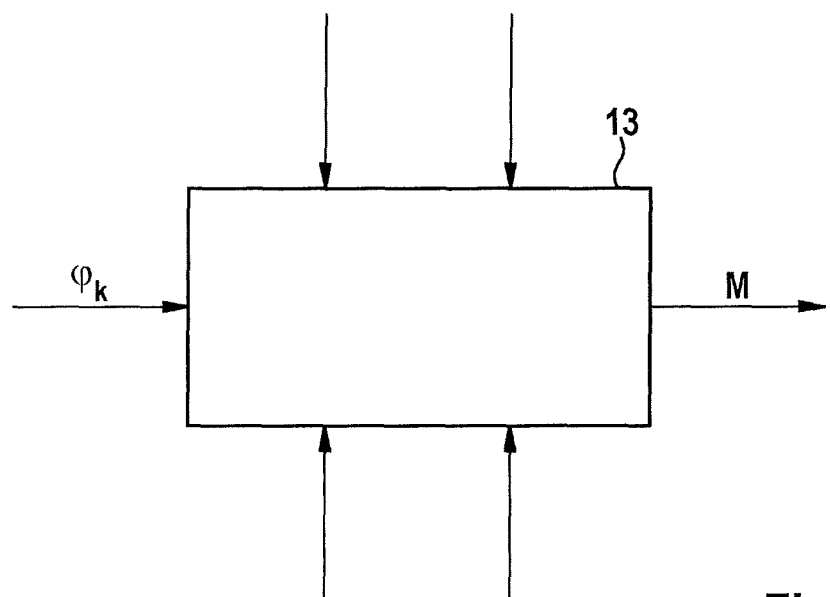
FIG. 4 shows a block representation including the input and output quantities of a torque control that is used to stabilize the two-wheeled vehicle during cornering.

In vehicle model 12, from steering angle difference $\Delta\phi$, including the operational sign of the steering angle difference, from which a drifting at the rear wheel, respectively understeering at the front wheel may be inferred, a steering-angle controlled variable $\phi_k$ is generated, which, as illustrated in FIG. 4, is fed as an input quantity to a torque controller. Moreover, nominal values are generated as an output variable in vehicle model 12 that are subtracted from corresponding actual values that originate from block 10. The difference is fed as an input quantity to observer 11. The nominal and actual values are, in particular, the vehicle velocity, the angle of inclination and the steering angle.

Moreover, observer 11 may be fed a drift angle tolerance $\gamma$ as an input variable that is considered in the calculation of nominal steering angle $\phi_d$. Via drift angle tolerance $\phi_d$, a drift angle, thus, the deviation of the vehicle longitudinal axis from the ideal line, may be allowed, for example, in absolute numbers 1° or 3° in both directions. Via drift angle tolerance $\gamma$, the handling performance may be influenced; a sportier handling performance being selected with increasing drift angle tolerance.

FIG. 4 shows torque controller 13 for adjusting torques M at the front wheel, respectively rear wheel. Torque controller 13 is fed steering-angle correction quantity $\phi_k$ that has been calculated in block 12 (FIG. 3). As further input quantities, correction quantities for the angle of inclination, the drift angle tolerance, correction quantities for accelerations and velocities may be considered, as well as, optionally, a driving mode to be set by the driver, for example, a sporty or comfortable driving mode. Moreover, an allowable drift angle may be preselected that is likewise considered as an input quantity.

Output variable M is an actuating signal that is fed to an actuator in the drive engine of the two-wheeled vehicle or is fed to one of the wheel brakes at the front wheel, respectively the rear wheel for adjustment. Torque controller 13 is advantageously realized in a regulating, respectively control unit which may also include observer 11 and vehicle model 12 of FIG. 3.

What is claimed is:

1. A method that stabilizes a two-wheeled vehicle during cornering, comprising:
   measuring at least one driving state value including an actual steering angle;
   inferring, based on the at least one driving state value, one of a drifting of a rear wheel or an understeering of a front wheel; and
   stabilizing the two-wheeled vehicle by altering a torque at least one of at the front wheel and at the rear wheel.

2. The method as recited in claim 1, wherein the at least one driving state value further includes measured acceleration values, and wherein a critical driving state is inferred from the measured acceleration values and the actual steering angle.

3. The method as recited in claim 2, wherein a nominal steering angle is ascertained and, from a deviation between the actual steering angle and the nominal steering angle, the one of the drifting of the rear wheel or the understeering of the front wheel is inferred.

4. The method as recited in claim 3, wherein the nominal steering angle is ascertained from an angle of inclination and a vehicle velocity.

5. The method as recited in claim 4, wherein the angle of inclination is calculated from measured acceleration values.

6. The method as recited in claim 4, wherein a maximum allowable drift angle is specified.

7. The method as recited in claim 4, wherein a driving style is selected and specified among multiple driving styles.

8. The method as recited in claim 3, wherein a braking torque at the at least one of the front wheel and the rear wheel is altered.

9. The method as recited in claim 3, wherein an engine torque acting on the rear wheel is altered.

10. A regulating unit that stabilizes a two-wheeled vehicle during cornering, comprising:
    a control unit including a processor configured to perform the following:
        measuring at least one driving state value including an actual steering angle;
        inferring, based on the at least one driving state value, one of a drifting of a rear wheel or an understeering of a front wheel; and
        stabilizing the two-wheeled vehicle by altering a torque at least one of at the front wheel and at the rear wheel.

11. A non-transitory, computer-readable data storage medium storing a computer program having program codes which, when executed on a computer, performs a method that stabilizes a two-wheeled vehicle during cornering, the method comprising:
    measuring at least one driving state value including an actual steering angle;
    inferring, based on the at least one driving state value, one of a drifting of a rear wheel or an understeering of a front wheel; and
    stabilizing the two-wheeled vehicle by altering a torque at least one of at the front wheel and at the rear wheel.

\* \* \* \* \*